Sept. 29, 1959 J. D. LAWRENCE, JR 2,907,000

DOUBLE BASE DIODE MEMORY

Filed Aug. 5, 1955

INVENTOR.
JOSEPH D. LAWRENCE, JR.
BY
Charles C. English
AGENT

United States Patent Office 2,907,000

Patented Sept. 29, 1959

2,907,000

DOUBLE BASE DIODE MEMORY

Joseph D. Lawrence, Jr., Philadelphia, Pa., assignor to Sperry Rand Corporation, New York, N.Y., a corporation of Delaware Application August 5, 1955, Serial No. 526,630

24 Claims. (Cl. 340—173)

Figures 1, 2, 3:
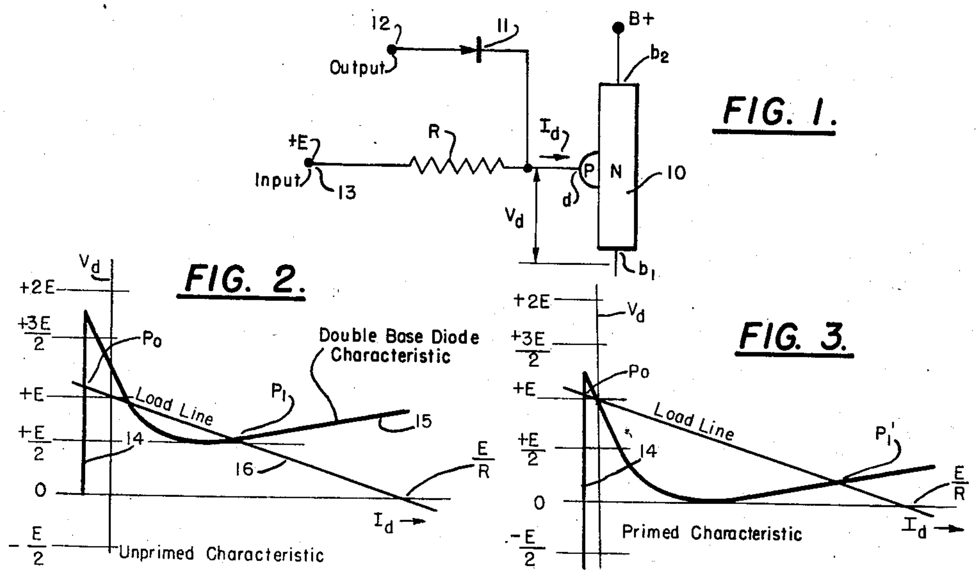

The present invention relates to systems capable of storing digital information, and is more particularly concerned with such systems utilizing double base semiconductor diodes as memory cells.

Many forms of memory systems are known in the computer art. For the most part, such systems require considerable attention to be given to the tolerances and current amplitudes of the drive circuits employed; and in addition, require special arrangements for regenerating information upon read-out from the system, as well as auxiliary amplification for such read-out. The present invention serves to obviate these disadvantages of known memory systems by providing arrays comprising double base semiconductor diodes whereby digital information may be readily stored in the resulting memory and non-destructively read-out at a relatively high signal level without the aid of auxiliary amplifiers.

By using such double base semiconductor diodes as a memory cell, therefore, the read-out circuits for the over-all memory are much simpler than those known heretofore, and provide a large signal output without auxiliary amplification. In addition, the tolerances and current amplitudes required of the drive circuits are more easily achieved than has been the case in other memories such as coincident current core memories. The present invention finds considerable utility in small memory systems such as small buffer storage memories, in which the relatively high cost per memory cell of the double base diode memories employed is sufficiently offset by the lower cost of driving and reading circuits so that the over-all memory is more economical than other types of memory systems now known in the art.

It is accordingly an object of the present invention to provide an improved memory system.

A still further object of the present invention resides in the provision of a double base semiconductor diode capable of operation as a memory cell.

A still further object of the present invention resides in the provision of orthogonal memory arrays utilizing double base diodes.

Another object of the present invention resides in the provision of a memory circuit permitting nondestructive read-out at high signal levels without the aid of auxiliary amplifiers.

A still further object of the present invention resides in the provision of a memory which can be either partially or completely cleared, preparatory to writing-in of new information.

A still further object of the present invention resides in the provision of a novel memory circuit wherein the tolerances and current amplitudes required of drive circuits may be more easily achieved than has been the case in memory devices known heretofore.

A further object of the present invention resides in the provision of a memory device which is less expensive than has been the case in memory systems known heretofore.

A further object of the present invention resides in the provision of a memory array capable of assuming relatively small sizes and which has better operating characteristics than has been the case heretofore.

In accordance with the foregoing objects and advantages, the present invention provides orthogonal memory arrays comprising a plurality of double base diodes. Such diodes may be arranged to exhibit a pair of distinct stable states; and at least one of these stable states may be selectively shifted by suitably varying the potential applied to one of the bases of the double base diode. When so employed, therefore, binary digits, for instance, may be written-into and stored in the memory, and may subsequently be non-destructively read-out therefrom by applying appropriate potentials to the several terminals of the diodes. In addition, the memory cells may be arranged in an array comprising a plurality of registers, and the individual registers may be cleared, or the over-all array may be cleared by applying further appropriate potentials to selected lines of the array.

The foregoing objects, advantages, construction and operation of the present invention will become more readily apparent from the following description and accompanying drawings, in which:

Figure 1 illustrates a double base semiconductor diode arranged as a memory cell.

Figure 2 graphically illustrates the unprimed characteristic of the device of Figure 1.

Figure 4:
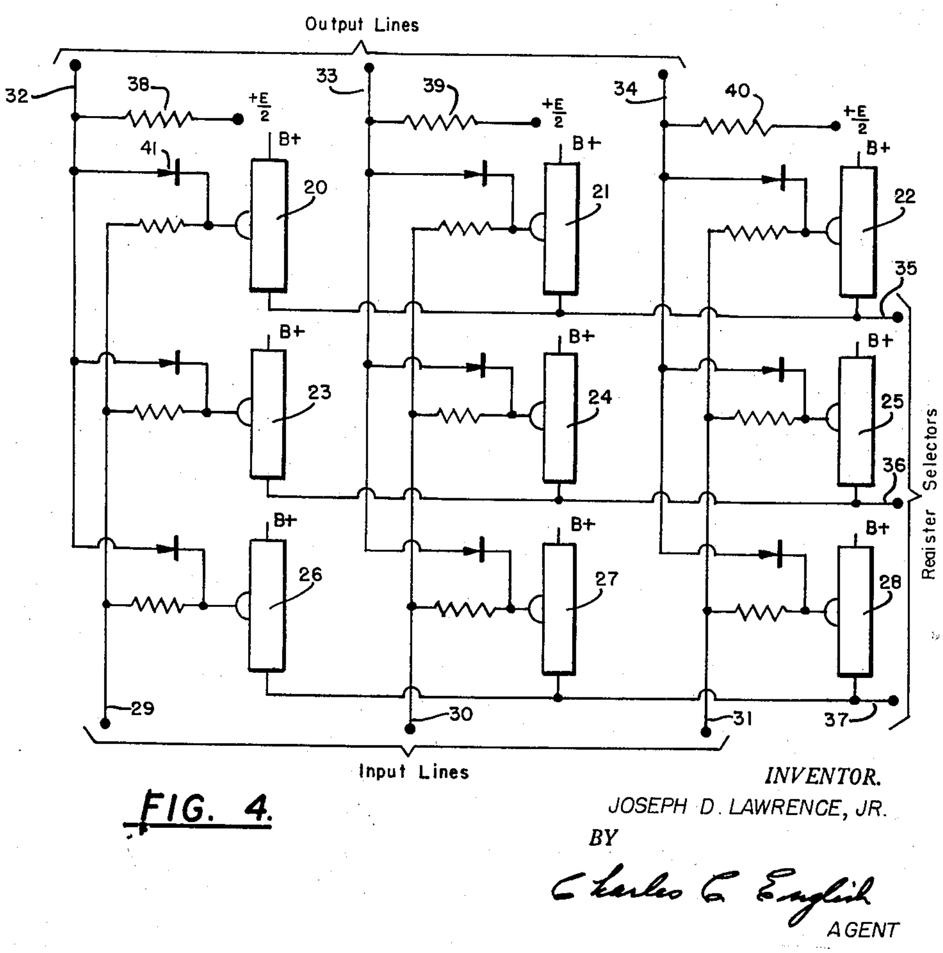

Figure 3 graphically illustrates the primed characteristic of the device of Figure 1; and Figure 4 illustrates an array of memory cells of the type shown in Figure 1, arranged in accordance with a preferred embodiment of the present invention.

Referring now to Figure 1, it will be seen that, in accordance with the present invention, a memory cell may comprise a semiconductor diode 10 having a pair of non-rectifying bases $b_1$ and $b_2$, and a rectifying junction *d*. Non-rectifying base $b_2$ is normally maintained at a potential somewhat higher than that of non-rectifying base $b_1$; and the said base $b_2$ may be coupled to a source of positive potential B+. The rectifying junction *d* is normally at some potential ($V_d$) between that of the potentials applied to non-rectifying bases $b_1$ and $b_2$; and an output diode 11 is coupled to the said rectifying junction *d* whereby outputs selectively appear at a terminal 12. In addition, an input terminal 13, which may have a potential, for instance of +E, applied thereto, is coupled to the rectifying junction *d* by a resistor R.

When so arranged, the double base semiconductor diode shown in Figure 1 exhibits two stable states, and this may be more readily seen by examination of the unprimed characteristic illustrated in Figure 2. The double base diode characteristic comprises a substantially vertical portion 14 and a curved portion 15; while the load line of the system is illustrated by 16. The load line 16 intersects the double base diode characteristic 14—15 at two stable operating points $P_0$ and $P_1$. The load line 16 also intersects the vertical axis of the coordinates at a value +E representative of the fixed potential applied to terminal 13 in Figure 1, and intersects the horizontal axis of the coordinates at a value *E/R* representative of the current $I_d$ which would flow if the potential $V_d$ was at zero and terminal 13 at +E. By this characteristic, therefore, it will be seen that when the device is operating at its first stable point $P_0$, a sufficient increase in $I_d$, for instance by increasing the potential at input terminal 13, will switch the cell from its stable point $P_0$ to its stable point $P_1$. Similarly, if the system should be operating at its stable point $P_1$, the device may be reverted to its stable point $P_0$, for instance by raising the potential on the non-rectifying base $b_1$ sufficiently to switch the device back to its stable point $P_0$.

The foregoing discussion of the characteristic shown in Figure 2 has assumed that the non-rectifying base $b_1$ is maintained at a potential of ground, and the characteristic may, therefore, be termed an "unprimed characteristic." If, however, the cell should be "primed," for instance by lowering the potential of base $b_1$ to a value $-E/2$, the primed characteristic will be changed to that illustrated in Figure 3. Examining Figure 3, it will be noted that the load line of the device remains the same as was the case in Figure 2, inasmuch as the potential +E is still applied to terminal 13 and the resistance R has not been changed. However, due to the priming of the device, the double base diode characteristic has been shifted in a downward direction. The device thus still exhibits two stable states and the first of these stable states $P_0$ is the same as the corresponding first stable state of the unprimed characteristic, inasmuch as this stable state is represented by an intersection of the fixed load line and a substantially vertical portion 14 of the double base diode characteristic.

Due to the downward shift of the double base diode characteristic, however, the second stable state is now represented by a point $P'_1$, and this stable state differs from that of $P_1$ discussed in reference to Figure 2. Examining Figures 2 and 3, for instance, it will be seen that stable state $P_1$ (Figure 2) is represented by a potential slightly in excess of $+E/2$, while stable state $P'_1$ (Figure 3) is represented by a potential less than $+E/2$. This shifting of the second stable point, due to priming of the double base diode, may thus be utilized to control the conductivity of diode 11 and thus permits the device of Figure 1 to act as a memory cell which may be employed in memory arrays having one, two or three input dimensions. By way of example, a two-dimensional embodiment of the invention has been illustrated in Figure 4.

Referring now to Figure 4, it will be seen that a memory array, constructed in accordance with one embodiment of the present invention, may comprise a plurality of double base diodes 20 through 28, etc. inclusive. The several rectifying junctions of the double base diodes employed may be coupled via resistance elements, as shown, to a plurality of input lines 29 through 31 inclusive, and may also be coupled via a plurality of diodes or rectifiers, as shown, to a plurality of output lines 32 through 34 inclusive. The several output lines 32—34, as well as the anodes of the several output diodes, are coupled via resistors 38—40 to sources of reference potential $+E/2$. In addition, the upper non-rectifying bases of the several double base diodes 20—28 are coupled to sources of positive potential B+, in the manner described in reference to Figure 1, while the lower non-rectifying bases are connected, as shown, to a plurality of register selector lines 35, 36 and 37.

In the arrangement of Figure 4, each horizontal row of memory cells constitutes a distinct register. Thus, cells 20 through 22, cells 23 through 25, and cells 26 through 28, are separate registers and these registers are respectively controlled by register selector lines 35, 36 and 37. The register selectors 35 through 37 are normally maintained at zero potential; but a register is primed when it is desired to write into it, or read out of it, by lowering the potential of the appropriate register selector line, thereby to prime or translate downward the characteristic of all double base diodes comprising the register, in the manner described in reference to Figure 3.

In operation, let us assume that each of the register selector lines 35, 36 and 37 is originally at a potential of zero volts, while each of the input lines 29, 30 and 31 is originally at a potential of +E. If it is desired to write information into a particular register, the potential of the register selector line associated with that register is lowered in potential, thereby to prime the register. Thus, let us assume that each of the memory cells is initially at its $P_0$ stable point and that it is desired to write information into the register comprising cells 20, 21 and 22. In such an event, the potential of register selector line 35 would be lowered to a value $-E/2$, thereby to prime this register. Information to be stored may thereafter be applied to one or more of input lines 29, 30 and 31. If it is desired to store a binary digit "0" in each of the cells 20, 21 and 22, the potential of the lines 29, 30 or 31 is unchanged and the primed double base diodes 20, 21 and 22 thus remain at the first stable point $P_0$. To write a binary digit "1" into one of of the cells, however, the appropriate input line is raised from its potential +E to a potential $+3E/2$. In the absence of priming, this increased potential on the input line would not be sufficient to switch the double base diode to its second stable point (see Figure 2). However, due to the downward shift of the diode characteristic upon priming, the applied input potential of $+3E/2$ will switch the primed double base diode from its first stable point $P_0$ to its second stable point $P'_1$ (see Figure 3); and when the priming potential applied to a particular register selector is removed, the memory cell will remain at its second stable point $P_1$ (see Figure 2). Thus, if it is desired to store a binary digit "1," in the memory cell 20, for instance, register selector line 35 is lowered to a potential $-E/2$, thereby to prime all of the cells 20 through 22, and the potential of input line 29 is raised to a value $+3E/2$. This operation is sufficient to switch memory cell 20 to its second stable point, but will not affect memory cells 23 and 26 inasmuch as they are located in unprimed registers. By this system, therefore, information may be stored selectively in any of the cells comprising the memory array.

If, subsequent to storage of information, a particular register should be primed, its stored information appears on output lines 32, 33 and 34. Thus, let us assume that a "1" is stored in memory cell 20 only; and that the cells 21 and 22 have "0's" stored therein. If register selector line 35 should then be primed to read out the information stored in its register, the rectifying junction of memory cell 20 will fall to a value below $+E/2$, representative of the stable point $P'_1$ (see Figure 3). Each of the output lines 32, 33 and 34 are returned to positive potentials $+E/2$ via resistances 38, 39 and 40 respectively. The fall in potential of the rectifying junction of memory cell 20 below a value $+E/2$, therefore, will render output diode 41 conductive and the output will be characterized by a drop in potential of the output line 32 below this value $+E/2$, thereby providing a signal indicating that a "1" is stored in cell 20. The other cells in the register which contain "0's" will have their rectifying junctions maintained at a potential in excess of $+E/2$ upon priming of the register (see Figure 2), and the other output lines will not change in output potential, thus indicating a "0" is stored in both cells 21 and 22.

To summarize the foregoing, therefore, for the reading of stored information in a given register, the selector line of that register is primed. If a memory cell of that register contains a "0," the potential of its rectifying junction will remain above the value $+E/2$, and current will not flow from the $+E/2$ sources via the resistors 38, 39 and/or 40, and via the output diode connected to the rectifying junction, whereby the output line 32, 33 and/or 34 will remain fixed in potential at $+E/2$. If a cell of the register contains a "1," however, the priming of the register reduces the potential of the rectifying junction of that cell to a value below $+E/2$, whereby current flows from the constant $+E/2$ source via the resistor 38, 39, or 40, and thence via the output diode, such as 41, connected to the rectifying junction, thereby to lower the potential of the appropriate output line, giving an output.

It will be appreciated that the reading-out of information in this manner is non-destructive in nature, that is, reading the memory does not remove information from the memory, and that in addition, relatively high signal levels of output may be effected at the output lines 32, 33 and/or 34 without the use of auxiliary amplifying equipment.

To clear any given register, the potential on its register selector line may be raised to a value sufficiently above zero to switch all diodes in that register which might contain "1's," to their $P_0$ stable point of operation. The registers may be individually cleared by so raising the potential of individual register selector lines, or the entire memory may be cleared by raising the potential of all the register selector lines.

While I have described a preferred embodiment of the present invention, many variations therein will be suggested to those skilled in the art. The foregoing description is, therefore, meant to be illustrative only and is not limitative of my invention, and all such variations as are in accord with the principles discussed are meant to fall within the scope of the appended claims.

Having thus described my invention, I claim:

1. In an information storage system, a memory cell exhibiting two stable states of operation and comprising a double base semiconductor diode having a rectifying junction, means for selectively applying different inputs to said rectifying junction, and means for selectively varying the potential difference between said rectifying junction and one of said bases together with said selective application of inputs, said inputs and the variation of said potential difference being such that one of said inputs together with said potential difference variation is effective to change said diode from one stable state to another thereby to store information of one significance, and another of said inputs together with said potential difference variation is ineffective to change said diode to said another state thereby to store information of a different significance.

2. The system of claim 1 including output means coupled to said rectifying junction, said output means including a further diode and means selectively biasing said further diode to be non-conductive for certain voltages at said rectifying junction.

3. In an information storage system, a memory cell comprising a semiconductor diode having two stable operating points, said diode including first and second bases and a rectifying junction, means maintaining said first base at a predetermined potential, means for selectively varying the potential of said second base thereby to shift the positions of said stable operating points relative to one another, and means for selectively coupling signals to said rectifying junction subsequent to a predetermined change in the potential of said second base.

4. In an information storage system, a memory cell comprising a double base semiconductor diode having a rectifying junction, said diode having a characteristic exhibiting two stable points of operation, means selectively varying the potential of one of said bases to selectively shift said characteristic thereby to shift the positions of said stable points of operation relative to one another, and means selectively coupling information of one of two possible significances to said rectifying junction upon said shift in characteristic, whereby said diode operates at one of its stable points in response to the coupling of information of one of said significances, and operates at the other of its stable points in response to the coupling of information of the other of said significances.

5. The system of claim 4 including output means coupled to said rectifying junction, said output means being responsive to predetermined variations in the potential of said rectifying junction.

6. In an information storage system, a memory cell comprising a double base semiconductor diode having a rectifying junction, said diode having a characteristic exhibiting two stable points of operation representative respectively of informations of two possible significances stored in said memory cell, means for selectively varying the potential of one of said bases thereby to shift said diode characteristic whereby the potential of said rectifying junction varies when the said diode is at one of its stable points, the potential of said rectifying junction remaining substantially constant for the said potential variation of said one of said bases when said diode is at the other of its stable points, means for selectively applying an input potential to said rectifying junction during said shift in said diode characteristic, said input potential being of sufficient magnitude to shift said diode to said one of its stable points from said other stable point to store information of one of said two possible significances, information of the other of said two possible significances being stored upon application of an input potential to said rectifying junction of insufficient magnitude to shift said diode to said one of its stable points during said shift in said diode characteristic, and output means responsive to variation in potential of said rectifying junction.

7. The storage system of claim 6 wherein said output means includes a further diode coupled to said rectifying junction, and means maintaining said further diode non-conductive in the absence of a predetermined variation in potential of said rectifying junction.

8. In an information storage system, a memory register comprising a plurality of double base diodes each of which has a rectifying junction, means maintaining one base of each of said diodes at a predetermined potential, means for selectively and simultaneously varying the potential of the other bases of said diodes, the variations in potential at said other bases being sufficient to vary differently the potentials at corresponding rectifying junctions for different states of said diodes but not sufficient to change the states of said diodes, and a plurality of output means coupled respectively to said rectifying junctions, each of said output means being individually responsive in different ways to the different variations in potential of its corresponding rectifying junction upon variation in potential of said other bases of said diodes.

9. The storage system of claim 8 wherein each of said output means includes an output line, a rectifier interposed between said output line and one of said rectifying junctions, and a source of reference potential coupled to said rectifier for maintaining said rectifier in a predetermined state of conductivity in the absence of a predetermined minimum variation in potential of said rectifying junction.

10. The storage system of claim 9 including a plurality of input lines respectively coupled to said rectifying junctions, and a plurality of signal sources respectively coupled to said plurality of input lines for selectively varying the potential of each of said input lines between first and second potential levels respectively representative of two possible input information quantities.

11. In an information storage system, a memory array comprising a plurality of storage registers, each of said registers comprising a plurality of double base diodes each of which has a rectifying junction, each of said diodes exhibiting two stable operating points, a plurality of input lines, means coupling each of said input lines to a double base diode in each of said registers respectively, a plurality of register selector lines, means coupling each of said register selector lines to one base of each of the diodes comprising a register respectively, and a plurality of control means coupled to said plurality of register selector lines for selectively varying the potential of preselected ones of said selector lines to cause said diodes of the preselected register to operate on an unprimed or a primed characteristic, a plurality of input signal sources coupled to said input lines, each of the input signals of said sources varying between a first and a second potential in accordance with the information to be stored, whereby correspondence between an input signal of said first potential and operation of a corresponding register on said primed characteristic causes storage of information of a first significance and correspondence between an input signal of said second potential and operation of said corresponding register on said primed characteristic causes storage of information of a second significance.

12. The storage system of claim 11 including a plurality of output lines, and means coupling each of said output lines to a double base diode in each of said registers respectively.

13. An information storage system comprising a plurality of double base diodes each of which has a rectifying junction, means maintaining one base of each of said diodes at a predetermined potential, a plurality of control means respectively coupled to the other bases of said diodes for selectively varying the potential applied to said other bases thereby to selectively and individually condition said diodes for the storage and read-out of information, an input line, means coupling the rectifying junctions of said diodes in parallel to said input line, means selectively varying the potential of said input line in response to information to be stored in a preselected one of said diodes, an output line, and means coupling each of said diodes in parallel to said output line.

14. The system of claim 13 wherein said last named means comprises a plurality of rectifiers respectively interposed between said output line and the said rectifying junctions of said double base diodes.

15. In an information storage system, a memory register omprising a plurality of double base diodes each of which exhibits two stable operating points, means maintaining one base of each of said diodes at a predetermined potential, control means coupled to the other bases of said diodes, said control means being selectively operative to change the potential of said other bases in a first direction from a reference potential to shift the positions of said stable operating points relative to one another in each of said diodes input signal means selectively operative to shift the operation of said diodes to a second stable state from a first of said stable states upon shifting of said stable operating points, and output means for detecting the change in potential at said rectifying junction of the respective diodes upon occurrence of said shifting of said stable operating points during the absence of said input signals thereby to read out information previously stored, said control means being selectively operative to change the potential of said other bases in a second direction, opposite to said first direction, from said reference potential thereby to selectively clear said register of information stored therein.

16. In an information storage system, a memory cell comprising a semiconductor diode having two base connections and a rectifying junction connection, said diode having a characteristic exhibiting two stable states of operation, means for selectively changing the potential between said two base connections thereby to shift the diode operation when in one of said stable states, means for selectively applying different potentials to said rectifying junction connection with said selective changing of the potential between said base connections to produce one and the other of said stable states respectively when information of one and another significance respectively is to be stored, a rectifier connected to said rectifying junction connection, and a source of potential coupled through said rectifier to said rectifying junction connection, which potential is of magnitude to produce current flow through said rectifier when said diode is in said one stable state and said diode operation is shifted.

17. In an information storage system, a memory cell comprising a semiconductor diode having two base connections and a rectifying junction connection, the state of said diode corresponding to a first and second stable point of operation on the current-voltage characteristic of said rectifying junction connection for a first potential between said base connections, said second stable point of operation being at a lower voltage than said first stable point, the state of said diode being altered to correspond to a third point of operation upon application of a second potential between said base connections, said third point corresponding to a potential different from that of said first and second stable points, means for changing the potentials between said bases from said first to said second potentials and simultaneously altering the potential applied to said rectifying junction connection in magnitude to change the state of said semiconductor from said first stable point to said second stable point of operation thereby to store information of one significance, said semiconductor remaining at said first stable point when said potential applied to the rectifying junction connection is not altered simultaneously with a change in said base potentials thereby to store information of a second significance, a potential source related in magnitude to the rectifying junction connection potential corresponding to said second stable point, rectifier means coupling said potential source and said rectifying junction connection to carry forward current when application of said second base potential causes said semiconductor to assume the state of said third point whereby said current is indicative of stored information of said one significance, said potential source being such that said rectifier carries substantially no current when said semiconductor remains in the state of said first stable point to indicate stored information of a second significance.

18. A memory cell comprising a semiconductor diode having two base connections and a rectifying junction connection, means for applying potentials to said base connections, input means coupled to said rectifying junction connection for supplying signals thereto to cause said semiconductor to operate in a first stable state corresponding to an input signal of one value and a second stable state corresponding to an input signal of another value, means for changing the potential of at least one of said base connections to shift the potential at said rectifying junction connection corresponding to said second stable state, and means for determining the value of a previous input signal including means for detecting said shift in potential of said rectifying junction connection upon said change in base potential.

19. The memory cell of claim 18 in which said means for determining the value of a previous input signal comprises a diode operable to conduct current only upon said change in base potential when the previous input signal was of said other significance.

20. A memory cell comprising a semiconductor diode having first and second bases and a rectifying junction, said diode having two stable states of operation, in one of which a terminal connected to said rectifying junction assumes similar voltage values for both a first and second value of potential difference between said bases, and in the other of which said junction terminal assumes dissimilar voltage values for said first and second values of said potential difference, means for sensing the state of said diode, said sensing means including means for changing said potential difference between said bases from said first to said second value without changing the state of said diode, and means for detecting said values of voltage at said junction terminal.

21. A memory system comprising a plurality of semiconductor diodes each having first and second bases and a rectifying junction terminal, each of said diodes having two stable states of operation, in one of which the voltage of said rectifying junction terminal thereof assumes similar voltage values for both a first and second value of potential difference between said bases, and in the other of which said junction terminal assumes dissimilar values for said first and second values of said potential difference, means for sensing the states of said diodes, said sensing means including means for changing said potential difference between the bases of each of said diodes from said first to said second value without changing the state of said diode, and means for detecting said values of voltage at said junction terminals.

22. In an information storage system, a memory register comprising a plurality of double base diodes each of which has a rectifying junction terminal, means maintaining one base of each of said diodes at a predetermined potential, means for selectively and simultaneously varying the potential of the other bases of said diodes in amounts that are sufficient to vary in different magnitudes the potentials at corresponding junction terminals for different states of said diodes respectively but not sufficient to change the states of said diodes, and a plurality of output means coupled respectively to said rectifying junction for detecting said different magnitudes of potential variation.

23. A memory register as set forth in claim 22, wherein each of said output means separately include an output line, a rectifier interposed between said output line and one of said rectifying junctions, and means for applying a reference potential to said rectifier whereby said rectifier tends to be in different states of conductivity for said different magnitudes of potential variation and indicates said different states of diode.

24. The storage system of claim 22 including a plurality of input lines respectively coupled to said rectifying junction terminals, and a plurality of signal sources respectively coupled to said plurality of input lines for selectively varying the potential of each of said input lines between first and second potential levels.

References Cited in the file of this patent

UNITED STATES PATENTS

| | | |
|---|---|---|
| 2,734,184 | Rajchman | Feb. 7, 1956 |
| 2,769,926 | Lesk | Nov. 6, 1956 |
| 2,802,117 | Mathis et al. | Aug. 6, 1958 |
| 2,820,152 | Mathis et al. | Jan. 14, 1958 |

OTHER REFERENCES

Electronics, March 1955, pp. 199–202, "Double-Base Diode Applications," Suran.